US006755152B1

(12) United States Patent
Cooper

(10) Patent No.: US 6,755,152 B1
(45) Date of Patent: Jun. 29, 2004

(54) METHOD AND APPARATUS FOR CLEARING MOISTURE IN MILKING SYSTEM PULSATION MONITOR

(75) Inventor: Martin Chandler Cooper, Stephenville, TX (US)

(73) Assignee: Senseability, Inc., Dublin, TX (US)

( * ) Notice: Subject to any disclaimer, the term of this patent is extended or adjusted under 35 U.S.C. 154(b) by 0 days.

(21) Appl. No.: 10/443,357

(22) Filed: May 22, 2003

(51) Int. Cl.[7] .................................................. A01J 5/10
(52) U.S. Cl. .............................. 119/14.02; 119/14.14; 119/14.37; 119/14.44
(58) Field of Search ......................... 119/14.02, 14.07, 119/14.08, 14.14, 14.44, 14.18, 14.29, 14.3, 14.37, 14.38, 14.39

(56) References Cited

U.S. PATENT DOCUMENTS

| | | | |
|---|---|---|---|
| 4,391,221 A | | 7/1983 | Hoefelmayr et al. |
| 4,944,249 A | | 7/1990 | Takeuchi et al. |
| 5,010,844 A | | 4/1991 | Takeuchi et al. |
| 5,275,124 A | | 1/1994 | van der Lely et al. |
| 5,584,262 A | | 12/1996 | Schultz |
| 5,775,254 A | * | 7/1998 | Koster et al. ............. 119/14.38 |
| 5,860,388 A | | 1/1999 | Tan et al. |
| 6,152,076 A | | 11/2000 | Laub-Maier |
| 6,257,169 B1 | | 7/2001 | Oosterling |
| 6,553,934 B2 | | 4/2003 | Gentner et al. |

OTHER PUBLICATIONS

InnovAg, 4 sheets of information of products available.
DairyTest Professional, Document No. DR54–0053–01, 5 pages, InnovAg Pty. Ltd.
DairyTest Monitor, 3 sheets of information.
DairyTest Monitor, Document No. DR54–0047–07, 8 pages, InnovAg PTY. Ltd.

* cited by examiner

Primary Examiner—Yvonne Abbott
(74) Attorney, Agent, or Firm—Geoffrey A. Mantooth

(57) ABSTRACT

There is provided an apparatus and method for monitoring pulsation of a milking system in a dairy facility. The milking system includes vacuum hoses that extend from a vacuum source to a milking claw. The pressure in each vacuum hose is changed by a pulsator, with the vacuum hoses being out of phase with one another. The pressure sensors are coupled to the respective vacuum hoses, which sensors monitor the pressure pulsations to ensure that the pulsator is operating satisfactorily. The pressure sensors are coupled to the vacuum hoses by way of passageways or hoses. A bypass is provided between the passageways so as to provide air circulation in the otherwise dead air space in these passageways. The bypass is small so as to not interfere with the pressure measurements by the sensors and is located in close proximity to the pressure sensors so as to minimize the amount of dead air space. The bypass is operated continuously as long as the milking system is operated in order to prevent the accumulation of moisture and debris in the space between the bypass and the pressure sensors. The bypass enhances the reliability of a continuously operating pulsation monitoring apparatus.

10 Claims, 5 Drawing Sheets

METHOD AND APPARATUS FOR CLEARING MOISTURE IN MILKING SYSTEM PULSATION MONITOR

FIELD OF THE INVENTION

The present invention relates to milking systems such as are found in dairy barns, and in particular to methods and apparatuses for monitoring the pulsation system of milking systems.

BACKGROUND OF THE INVENTION

A milking facility automates the milking process of dairy animals, such as a cow. The cow is put into a pen and a milking claw is attached to the teats of the animal. The milking claw has four sleeves, one for each teat. A vacuum is applied to each sleeve in order to suck out the milk. However, a constant application of vacuum is undesirable because the teat and surrounding tissue will be damaged. A calf sucking on its mother does not apply a constant vacuum. Rather it sucks, then swallows and breathes before sucking again. Thus, the teat is put under a periodic suction or vacuum, interspersed with rests.

Automated milking facilities emulate this natural milking action by the use of a liner. The liner, which is elastomeric, is located inside of a shell of the sleeve. The liner is made to expand and contract so as to control the application of vacuum or suction to an individual teat. The liner is in turn controlled by a pulsator.

The pulsation system is a vital part of a milking facility. There is usually one pulsator for every cow being milked in the barn at that time. For example, if a barn can milk sixty cows at a time, the barn would typically have sixty pulsators. The pulsation system controls the liner that actually comes in contact with the cow's teats. The liner is fitted inside the shell. The liner is usually made of rubber or silicone while the shell is usually made of stainless steel or rigid plastic. Between the liner and the shell is an airtight chamber that is connected to the pulsator. The pulsation system alternates the liner between a vacuum state and a massage state. During the vacuum state or milking phase, the milk is drawn out of the teat with a vacuum applied to the teat end. During the massage state or rest phase, the liner collapses on the teat and massages the teat. The relaxation of the teat during the massage state is necessary to avoid accumulation of blood and fluid in the teat end which may lead to mastitis.

Mastitis is an inflammation of the mammary gland caused by injury or much more commonly the introduction of invading bacterial pathogens that multiply in the milk producing tissues. Mastitis reduces milk yield and alters the composition of milk and in many cases injures the animal to a point where she cannot recuperate and becomes an economic loss for the dairyman.

There are two main sub categories of mastitis; subclinical and clinical. Subclinical mastitis the form of the disease in which there is no observable indication of the disease, but the presence of bacterial pathogens can be detected in the milk by special testing. This form of the disease can be very detrimental to milk production in quality and quantity produced by the herd. Subclinical cows many times become clinical as the bacterial infection spreads.

Clinical mastitis is the form of the disease in which there is observable indications of an inflammation of the mammary gland (udder) and the milk produced may not be used for human consumption. Clinical mastitis results in a loss of the cow to milk production for some amount of time.

Three factors may contribute to the spread of mastitis: environment, milking procedures, and milking equipment. This invention pertains to the last factor, namely milking equipment. It evaluates the pulsator, which is a primary component of the milking equipment.

A properly performing pulsator operates in accordance with standards that determine the length of the milking phase, the rest phase and the transition periods between the milking and rest phases. Unfortunately, when a pulsator malfunctions, it usually is unable to execute the rest phase. This puts the cow's teat under a constant vacuum, potentially leading to mastitis.

The operation of the pulsators can be checked or monitored in a variety of ways. One prior art method utilizes a specialized computer that is carried by a technician. The technician checks each pulsator about once a month. I am a co-inventor of another pulsator monitoring apparatus and method that checks or monitors each pulsator on a continuous basis.

The pulsator monitoring apparatuses are connected to the equipment by way of monitoring hoses or lines. In the once-a-month check, the hoses from the pulsator are disconnected from the milking equipment and connected to the monitoring computer. In the continuous check, the pulsator monitoring apparatus is connected to the pulsator, or vacuum, hoses by a set of monitoring hoses. The pulsation monitor and the monitoring hoses are permanent equipment in the milking pen.

The pulsator continually alternates air pressure in the pulsation hoses between a vacuum and atmospheric pressure. The vacuum system is typically warm. In many dairy barns, particularly during the non-summer months, the milking pens have cold or cool atmospheric air therein. The constant exchange of a warm vacuum with cool air creates condensation. The condensation enters the monitoring hoses leading to the pulsator monitoring apparatus. The condensation in the hoses can interfere with the accuracy of the monitoring. For example, the condensation can completely occlude the inside diameter of a monitoring hose, thus blocking pressure changes from the pulsator. Alternatively, the condensation can occlude the opening of the respective pressure sensor, thus reducing the accuracy of the measurement.

Milking pens are dirty environments. Cows stomp and swish debris on to the ground and the equipment. Dairy barns are humid environments. Sprays of water are used to clean the milking pens and milking equipment. The continuous pulsation monitoring apparatus is subject to water sprays, which sprays lead to condensation.

With the monthly check, condensation is simply cleared out of the hoses leading to the monitoring equipment leading to the monitoring equipment by unconnecting the hoses and allowing the condensation to drain. This is simple because the hose must be disconnected anyway when moving from one pulsator to the next. However, with the advent of continuous monitoring of the pulsators, disconnecting the hoses on a periodic basis is time consuming and laborious.

SUMMARY OF THE INVENTION

It is an object of the present invention to provide a method and apparatus for either preventing or clearing the accumulation of condensation in hoses that monitor the operation of a pulsation system.

The present invention provides an apparatus for monitoring pulsation of a milking system in a dairy facility. The milking system comprises vacuum hoses extending from a vacuum source to a milking claw. The pressures in each of the vacuum hoses is changed by a pulsator, with the pressure changes in one vacuum hose being out of phase with the pressure changes in the other vacuum hose. The apparatus comprises pressure sensors, with each pressure sensor pneumatically coupled to a respective one of the vacuum hoses by a passageway. A bypass is provided between the passageways.

With the apparatus of the present invention, air circulation is provided in the passageways that extend from the vacuum hoses to the pressure sensors. This air circulation prevents dead air space, and the accumulation of moisture and debris in this dead air space. Thus, the apparatus enhances the reliability of the pulsation monitoring apparatus for a milking system.

In accordance with one aspect of the present invention, the bypass is located in proximity to the pressure sensors. This minimizes the amount of dead air space between the bypass and pressure sensors.

In accordance with another aspect of the present invention, the bypass is formed in a housing for the pressure sensors.

In accordance with still another aspect of the present invention, the housing comprises receptacles for receiving the pressure sensors and fittings for coupling to hoses. The bypass is located between the receptacles. This particular aspect has the bypass passageway built directly into a housing for the pressure sensors.

In accordance with another aspect of the present invention, the inside diameter of the bypass is between 0.05–0.002 inches.

In accordance with still another aspect of the present invention, the bypass is always open.

The present invention also provides a method for monitoring pulsation of a milking system. The milking system comprises sleeves for coupling to an animal's teats. The sleeves are connected to a pulsation subsystem by vacuum passageways. The pulsation subsystem produces pressure pulsations in the vacuum passageways in the sleeves that vary between a milk phase and a rest phase. The pressure pulsations in a first one of the vacuum passageways is out of phase with the pressure pulsations in the second one of the vacuum passageways. The pressure pulsations in the first and second vacuum passageways are monitored from respective first and second locations. The first location is coupled to the first vacuum passageway by a first passage and the second location is coupled to the second vacuum passageway by a second passage. Air is vented between the first and second passageways so as to prevent the accumulation of condensation therein.

In accordance with another aspect of the present invention, the step of venting air between the first and second passageways occurs within one inch of the first and second locations.

In accordance with still another aspect of the present invention, the step of venting air between the first and second passages occurs continuously during the operation of the milking system.

In accordance with still another aspect of the present invention, the step of venting air between the first and second passages further comprises the step of venting a small amount of air so as to not affect the step of monitoring the pressure pulsations in the first and second vacuum passageways.

DESCRIPTION OF THE PREFERRED EMBODIMENT

Figure 1:
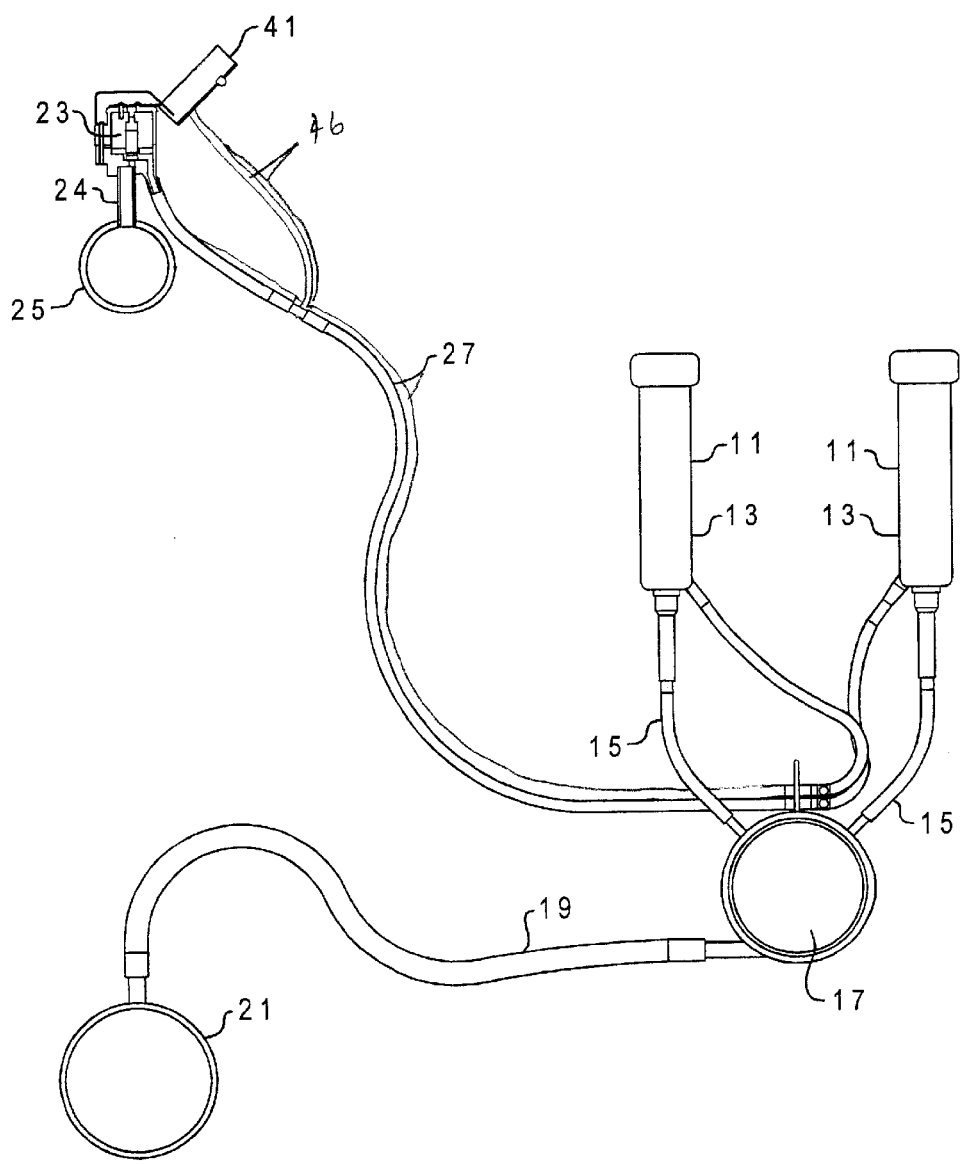
FIG. 1 shows the milking equipment in a pen of a dairy barn, with the pipes shown in cross-section.

In FIG. 1, there is shown the portion of a milking system that is located in a milking pen. Such a system is common to dairy barns. A milking claw 11 is coupled to the teats of the cow. The milking claw has four sleeves 13, one for each teat. (Only two sleeves are shown in FIG. 1, the other two sleeves are hidden behind the sleeves that are shown.) The milk from the cow drains down the sleeves into a hose 15 and then into a manifold 17. The manifold 17 collects the milk from all four sleeves 13. The milk then enters another hose 19 and is delivered to a milk line 21. The milk line 21 slopes down through all of the milking stalls on one side of the barn and into a collecting tank (not shown). A vacuum is applied to the sleeve 13 via the milk line 21. The vacuum assists in drawing the milk out of the teat.

In order to avoid subjecting the teat to a constant vacuum, a condition that could lead to mastitis, the milk line 21 vacuum is pulsed by a pulsation subsystem which includes a pulsator 23. The pulsator 23 is coupled to a vacuum line 25 that extends through all of the milking stalls on one side of the barn. A short rigid pipe 24 couples the pulsator 23 to the vacuum line 25 (See FIG. 2). The vacuum pressure in the vacuum line 25 is the same as the vacuum pressure in the milk line 21, because a single vacuum source is used for both pipes. The pulsator 23 is connected to the sleeves 13 by vacuum hoses 27. Thus, vacuum passageways extend from the vacuum line 25 to the sleeves 13 by way of the pipe 24, the pulsator 23 and the vacuum hoses 27.

Pulsators 23 are conventional and commercially available. The pulsators 23 typically contain solenoids 26 (see FIG. 2) which open and close valves to allow either vacuum or atmospheric pressure to be applied to the vacuum hoses 27. Each stall has a pulsator 23 and each pulsator has two vacuum hoses 27 extending therefrom. There is a vacuum hose 27 provided for two sleeves 43. The front and rear sleeves, which correspond with the front and rear teats of the cow, are alternated so as to maintain the milking claw on the animal. For example, while the front sleeves are in the milking phase, the rear sleeves would be in the rest phase and vice versa.

I have invented an apparatus and method for monitoring the operation of the pulsator. The pulsation monitoring apparatus 41 is described in U.S. Pat. No. 6,553,934, the disclosure of which is incorporated herein by reference.

Figure 2:
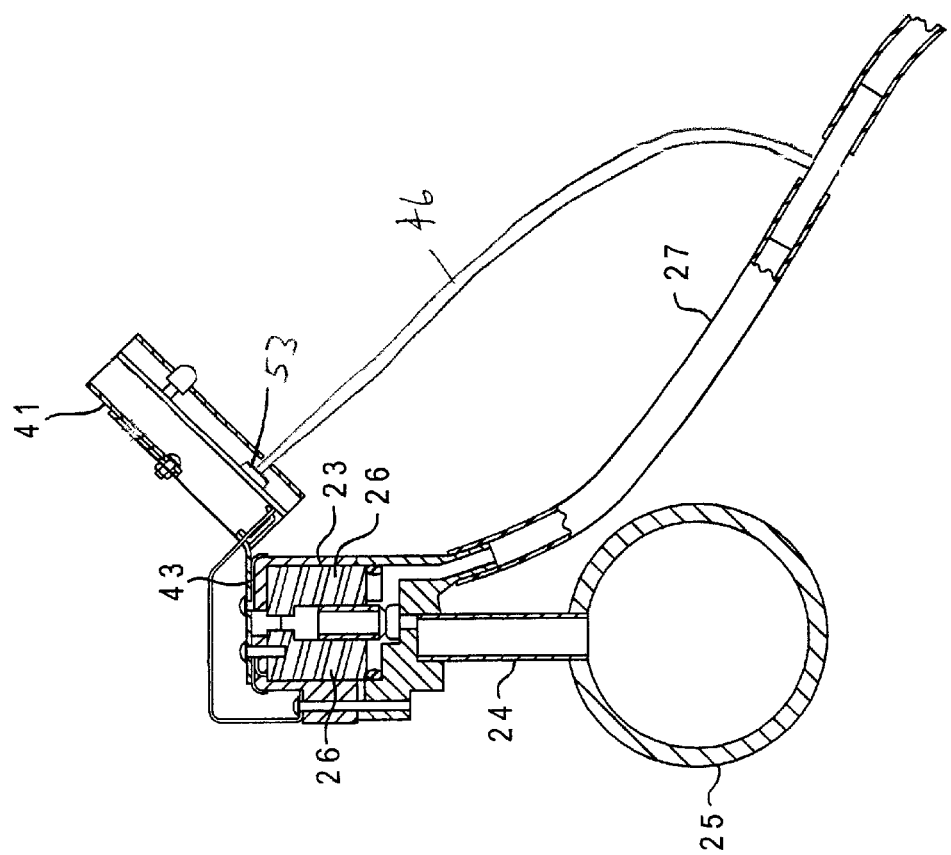
FIG. 2 is a close up side view of the pulsator, equipped with a pulsation monitoring apparatus, in accordance with a preferred embodiment.
Figure 3:
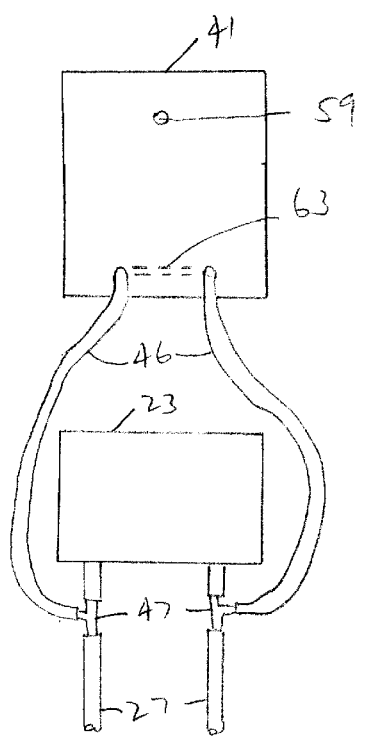
FIG. 3 is a schematic front view of the pulsator and the pulsation monitoring apparatus, in accordance with a preferred embodiment.

Referring to FIGS. 2 and 3, the pulsator monitoring apparatus 41 has a pressure sensor 53 for each vacuum passageway. In the preferred embodiment, the pressure sensors 53 are coupled to the vacuum hoses 27 by way of monitoring hoses 46. A monitoring hose 46 is connected to each vacuum hose 27. The monitoring hoses 46 extend from the vacuum hoses 27 to the pulsation monitoring apparatus 41 and allow the pulsation monitoring apparatus to access and monitor the pressure in the vacuum hoses.

Figure 4:
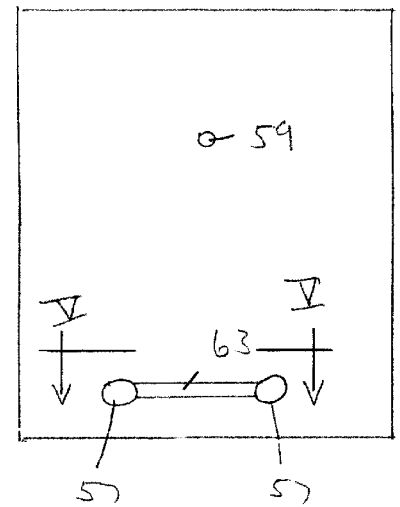
FIG. 4 is an inside view of the front panel of the pulsation monitoring apparatus.
Figure 5:
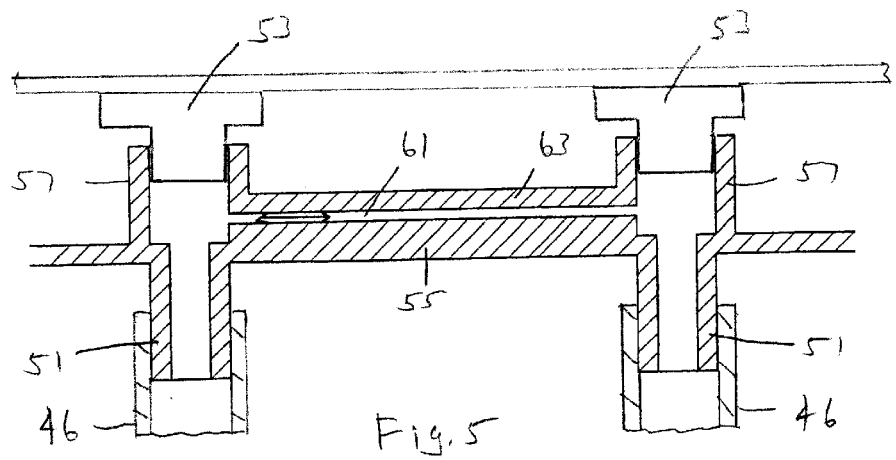
FIG. 5 is a cross-sectional view of the bypass in accordance with a preferred embodiment, taken through lines V—V of FIG. 4.

The monitoring hoses 46 are connected to the vacuum hoses 27 by way of respective "T" fittings 47 and are connected to the pulsator monitoring apparatus 41 by nipples 51 (see FIG. 5). Referring to FIGS. 4 and 5, the nipples 51 are typically formed in, or project through, the housing 55 of the pulsator monitoring apparatus. The pulsator monitoring apparatus has a pressure sensor 53 for each vacuum hose 27. In the preferred embodiment, the inside of the housing has receptacles 57 or ports for receiving the respective pressure sensors 53. The pressure sensors are mounted to a printed circuit board and are provided with nipples, which nipples receive the receptacles 57. O-rings provide a seal between the nipples and the receptacles 57. Thus, the pressure sensors are pneumatically coupled to the vacuum hoses 27 so as to monitor the pressure in those hoses. In FIG. 5, the pressure sensors and nipples are shown together as 53. The housing also has an opening 59 for an indicator light. The light indicates if the pulsator is operating within tolerances.

In order to clear the monitoring hoses 46 of condensation, a bypass passageway 61 is provided between the two monitoring hoses 46. In the preferred embodiment, this bypass is located in the housing 55, which housing is molded. As shown in FIG. 5, the bypass is between the two receptacles 57. In the preferred embodiment, the bypass 61 is about 0.008 inches in inside diameter.

The bypass 61 is located in a bypass member 63 that spans the distance between the two receptacles 57. In the preferred embodiment, the bypass 61 is formed by drilling lengthwise through the bypass member 63. The bypass member is an integral part of the plastic injection molded housing. The bit to drill the bypass can be inserted through an opposite side of one of the receptacles 57; the hole in this far side of the receptacle is later plugged with glue or some other filler. When drilled, the bypass diameter is 0.077 inches. The diameter of the bypass is reduced by inserting therein a microrod which leaves a clearance of about 0.008 inches.

The bypass 61 provides air circulation in the monitoring hoses 46 so as to clear any condensation in those hoses. The bypass 61 is sized to be sufficiently small so as to not to affect the accuracy of pressure measurements by the sensors 53. Furthermore, the bypass provides air circulation in a manner that maintains a closed system, so as to limit the possibility of debris or matter entering the lines and hoses 46, 27.

The size of the bypass 61 can vary between 0.05–0.002 inches inside diameter for milking system vacuum pressures (typically between 11.5–14 inches of mercury). The bypass passage 61 in the preferred embodiment is about one inch long. A bypass 61 that is shorter can be a smaller inside diameter, while a longer bypass can utilize a larger inside diameter opening or clearance.

The pressure sensors 53 typically each have a sensing element (such as a diaphragm) that is exposed to the air or vacuum in the hose 46. The sensing elements are separated from the vacuum passageways by some distance. It is desirable to locate the bypass 61 as close as possible to the sensing elements so as to minimize the "dead" or (noncirculating) airspace between the bypass and the sensing elements. In the preferred embodiment, the bypass is in close proximity to the sensing element. The bypass is within ⅛ inches of the sensing element, but could be within one inch or further. The passage of air through the bypass creates turbulence that can affect the accuracy of the pressure measurements, particularly in the transitory A and C phases. The size of the bypass can be enlarged if either the bypass is moved further away from the sensing elements (so as to minimize turbulence near the sensing elements) or if the electrical signals produced by the pressure sensors are processed or filtered to remove the "noise" caused by the bypass turbulence.

The bypass 61 is implemented in the preferred embodiment as an integral part of the housing 55. However, the bypass could be implemented in other ways, such as a discrete hose or line between the two monitoring hoses 46 (for example at a location that is outside of the pulsator monitoring apparatus housing 55). In this embodiment, the bypass would be a hose coupled to the monitoring hoses 46 by "T" fittings. The inside diameter of the bypass can be determined by an orifice. The orifice can be located in the bypass tubing or in one of the "T" fittings.

Referring to the embodiment of FIGS. 4 and 5, the housing 55 is assembled so that the receptacles 57 receive the pressure sensors 53. Then, the monitoring hoses 46 are coupled to the respective nipples 51. The pulsator monitoring apparatus is then ready for use.

Figure 6:
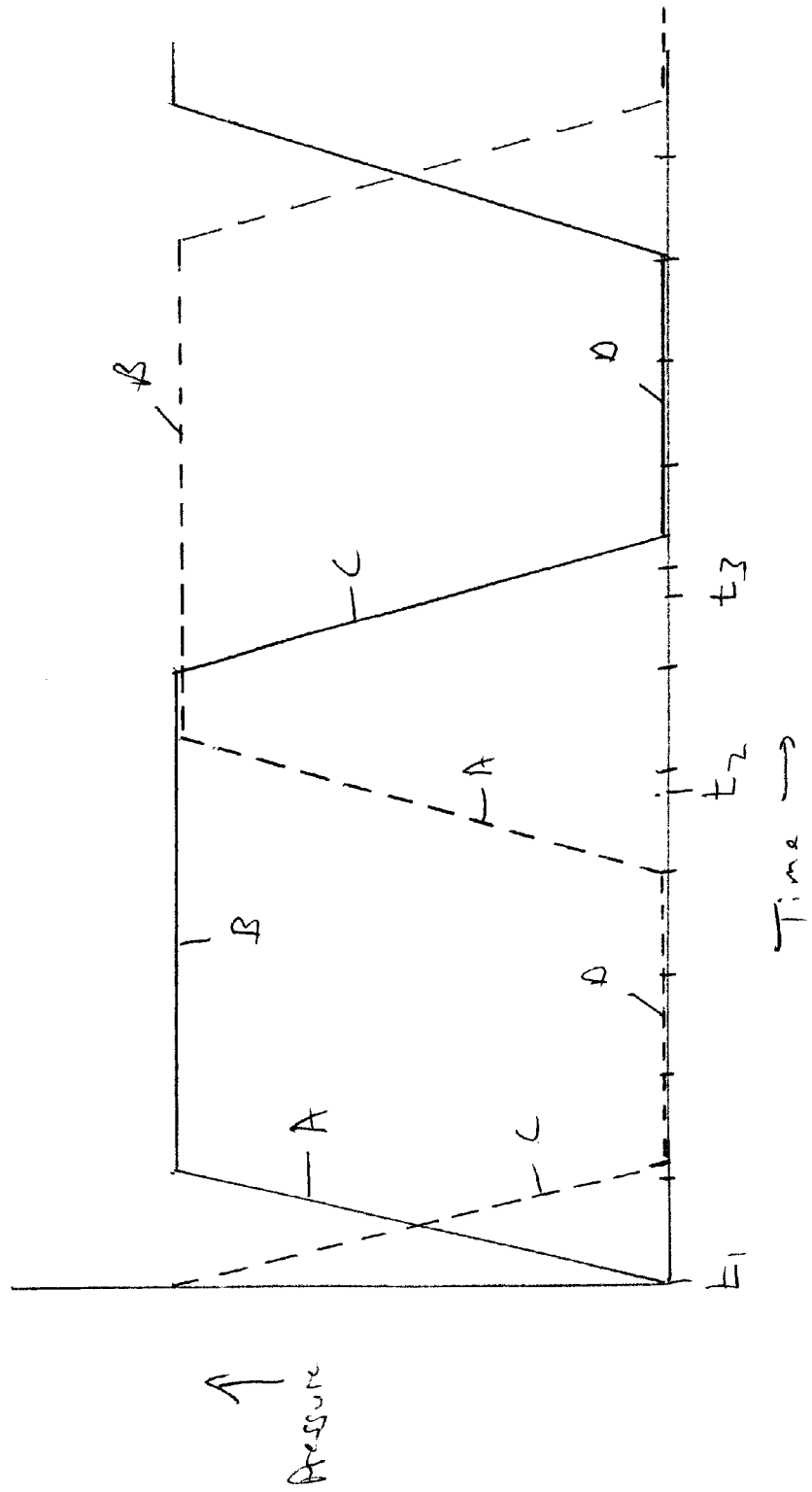
FIG. 6 is a diagram showing the pressure pulsations in the vacuum hoses.

In operation, the vacuum hoses 27 are subjected to pulses of pressure. As shown in FIG. 6, the pulses produced by the pulsator have A–D phases. In FIG. 6, the pulse in one monitoring hose is shown by a solid line, while the pulse in the other monitoring hose is shown by a dashed line. Each pulse will typically last about 1,000 milliseconds. The A phase transitions the respective vacuum hose and sleeve from 0 psig (or atmospheric pressure) to a vacuum (typically 13 inches of mercury). The B phase is the actual milking phase. The duration of the combination of the A and B phases is typically about 600 milliseconds, with the A phase being relatively short. The C phase is a transition phase from vacuum back to atmospheric pressure, while the D phase that follows is the rest phase at atmospheric pressure. The duration of the combined C and D phases is typically about 400 milliseconds, with the C phase being relatively short. The duration of the A–D phases is largely determined by the pulsator.

The two vacuum hoses are out of phase with respect to each other. While one vacuum hose is in the B, or milking, phase, the other vacuum hose is usually in the D, or rest, phase. This allows the milking claw to remain on the cow's udder.

The present invention takes advantage between the pressure differential between the two vacuum hoses 27. Because the pressure in the vacuum hoses is the same as the pressure in the monitoring hoses, there exists, for the majority of the pulse cycle, a pressure differential across the bypass 61. When one vacuum hose is in the B phase and the other vacuum hose is in the D phase, the pressure differential is high (on the order of 13 inches of mercury). Thus, air moves from the D phase monitoring hose to the B phase monitoring hose through the bypass 61. This creates air movement within the monitoring hoses 46 that prevents the accumulation of condensation and debris. Upon start up, any condensation in the monitoring hoses is quickly cleared out. In fact, during a test, a monitoring hose was filled with water to simulate a large amount of condensation. Once pulsation was initiated, the bypass provided sufficient pressure swings to clear the water out in a matter of seconds.

With the vacuum system on, the air circulation caused by the bypass results in a continuous cleaning of any moisture in the monitoring hoses. This continuous cleaning prevents the accumulation of condensation in the remaining dead space between the sensing elements and the bypass, as the condensation is unable to enter this dead space.

Furthermore, the direction of air flow in the bypass reverses every half cycle. This has the benefit of allowing a small size bypass, with no concern of that bypass passageway becoming plugged. In such a small sized passageway, a mere speck of matter could block or occlude the passageway. But, the change in air flow direction clears any debris and maintains the bypass in an open position. Furthermore, the reverse of air movement caused by the changing pressure differentials produces a powerful force that cleans or scours the inside of the monitoring hoses, as demonstrated by the test described above when the monitoring hose was filled with water.

The dairy industry traditionally has gone to great lengths to have a leak free pulsation system. A hole in the pulsator, any rubber goods connected to the pulsator, or anywhere else is quickly fixed in order to prevent damage to the cow's udder. The A and C phases are typically about 130 milliseconds each in duration. If the A and C phases lengthen in duration, then the milking and rest (B and D) phases will shorten, to the detriment and possible physical injury to the cow. The existence of a leak in the pulsation system lengthens the A phase, as pressure changes are retarded and atmospheric pressure air is being admitted to the system. The purposeful introduction of a leak in the pulsation system is therefore contrary to established dairy industry practice.

In spite of established dairy industry practice, the bypass 61 satisfactorily clears condensation and other debris from the monitoring hoses 46 without adversely affecting pulsation performance. One reason is that the bypass is of a calibrated size. The size of the bypass is small so that the volume of air moving through the bypass is insignificant to the performance of the pulsator. In addition, the volume of air does not adversely affect the accuracy of pressure measurements by the pressure sensors in the pulsation monitoring apparatus.

Furtherstill, the "leak" formed by the bypass from one vacuum hose to the other is not to atmospheric pressure, but is instead to the other side of the pulsator. This effectively cancels any adverse affects that may be caused.

To illustrate this cancellation principle, reference is made to FIG. 6, where the pressure pulses for the two monitoring hoses are shown. At time $t_1$, the first monitoring hose begins it's A phase and the second monitoring hose begins its C phase. The bypass helps to equalize the pressures in the two monitoring hoses and so works to improve or speed the initial portions of the A and C phases. When the pressures equalize and begin to diverge (the A phase continues toward full vacuum and the C phase continues to full atmospheric pressure), the bypass retards these later portions of the A and C phases. The improvement and retardation effectively cancel each other out so that the resulting B and D phases are not adversely affected.

Because the rest phases (C and D) are cumulatively a typical 400 milliseconds and the milking phases (A and B) are cumulatively a typical 600 milliseconds, the second monitoring hose has its A phase while the first monitoring hose is in its B phase. At time $t_2$, the bypass assists in equalizing these pressures, serving to speed the A phase. Conversely, the bypass retards the C phase (time $t_3$ of the first monitoring hose as the pressures diverge. The speeding and retarding cancel each other out. Thus, the net effect of the bypass of the pulsator's performance is zero.

Figure 7:
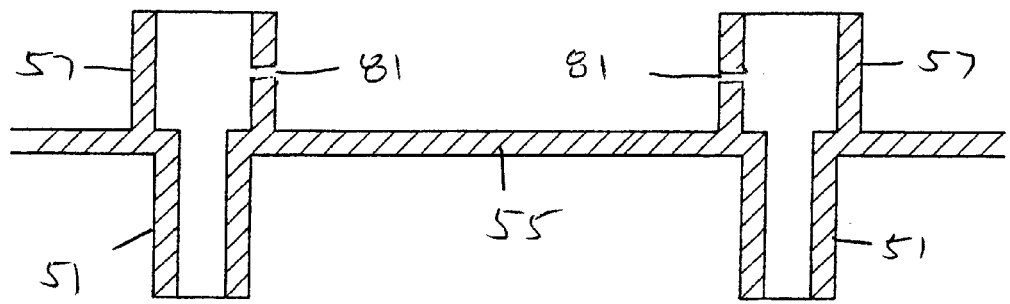
FIG. 7 is a cross-sectional view of a pressure sensor receptacle, in accordance with another embodiment.

FIG. 7 shows another embodiment, wherein small apertures 81 are provided in the receptacles 57 so as to allow air circulation in the monitoring hoses. The apertures vent the monitoring hoses to the atmosphere. This embodiment may be subject to clogging by debris, as the pulsation system is no longer closed, as it is with FIGS. 4 and 5. This embodiment of an open system provides the apertures at the receptacles located inside of the housing, to minimize clogging by debris. In addition, the embodiment of FIG. 7 could shorten the B phase, as the leaks caused by the apertures 81 slows the transition of atmospheric pressure to vacuum.

Figure 8:
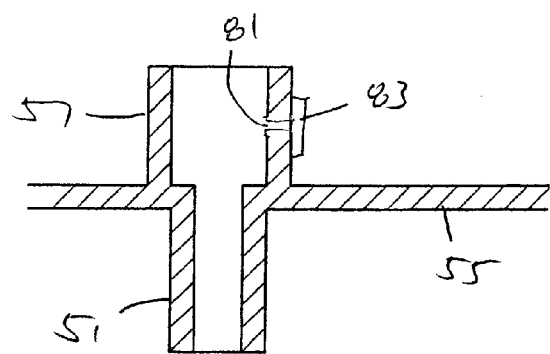
FIG. 8 is a cross-sectional view of a pressure sensor receptacle, in accordance with still another embodiment.

Still another embodiment vents the monitoring hoses to atmosphere, but for short durations of time, instead of continuously. Referring to FIG. 8, a valve 83 can be used to cover the aperture 81. The valve 83 is a simple flapper valve located so as to minimize the entry of debris into the pulsation system. This valve is pressure activated and opens to allow venting. Another type of valve could be activated independently of pressure, such as a solenoid valve. This type of valve is typically closed and periodically opens to allow air circulation for a short period of time.

A valve 83 is required for each aperture 81. The apertures remain small so as to minimize leakage into the pulsation system and any turbulence by the pressure sensors.

An advantage of my earlier invention for a pulsation monitoring apparatus in U.S. Pat. No. 6,553,934 is that the operation of a pulsator can be monitored continuously. This minimizes any injury to the cow, as a problem with the pulsator can be immediately identified. The pulsator and pulsator monitoring apparatus operate in a dirty, moisture filled environment. By providing a way to clear moisture and other debris from the lines, a robust and reliable pulsation monitoring system is achieved.

The foregoing disclosure and the showings made in the drawings are merely illustrative of the principles of this invention and are not to be interpreted in a limiting sense.

What is claimed is:

1. An apparatus for monitoring pulsation of a milking system in a dairy facility, the milking system comprising vacuum hoses extending from a vacuum source to a milking claw, the pressures in each of the vacuum hoses being changed by a pulsator, with the pressure changes in one vacuum hose being out of phase with the pressure changes in the other vacuum hose, the apparatus comprising:
   a) pressure sensors, each pressure sensor pneumatically coupled to a respective one of the vacuum hoses by a passageway;
   b) a bypass between the passageways.

2. The apparatus claim 1 wherein the bypass is located in proximity to the pressure sensors.

3. The apparatus of claim 1 wherein the bypass is formed in a housing for the pressure sensors.

4. The apparatus of claim 3 wherein the housing comprises receptacles for receiving the pressure sensors and fittings for coupling to hoses, the bypass being located between the receptacles.

5. The apparatus of claim 1 wherein the inside diameter of the bypass is 0.05–0.002 inches.

6. The apparatus of claim 1 wherein the bypass is always open.

7. A method for monitoring pulsation of a milking system, the milking system comprising sleeves for coupling to an animal's teats, the sleeves connected to a pulsation subsystem by vacuum passageways, the pulsation subsystem producing pressure pulsations in the vacuum passageways and the sleeves that vary between a milk phase and a rest phase, the pressure pulsations in a first one of the vacuum passageways being out of phase with the pressure pulsations in a second one of the vacuum passageways, comprising the steps of:

a) monitoring the pressure pulsations in the first and second vacuum passageways from respective first and second locations, the first location being coupled to the first vacuum passageway by a first passage and the second location being coupled to the second vacuum passageway by a second passage;

b) venting air between the first and second passages so as to prevent the accumulation of condensation therein.

8. The method of claim 7 wherein the step of venting air between the first and second passages occurs within one inch of the first and second locations.

9. The method of claim 7 wherein the step of venting air between the first and second passages occurs continuously during the operation of the milking system.

10. The method of claim 7 wherein the step of venting air between the first and second passages further comprises the step of venting a small amount of air so as to not to affect the step monitoring the pressure pulsations in the first and second vacuum passageways.

* * * * *